United States Patent [19]

Anderson et al.

[11] Patent Number: 5,552,351
[45] Date of Patent: Sep. 3, 1996

[54] CERAMIC MEMBRANES HAVING MACROSCOPIC CHANNELS

[75] Inventors: Marc A. Anderson; Reid A. Peterson, both of Madison, Wis.

[73] Assignee: Wisconsin Alumni Research Foundation, Madison, Wis.

[21] Appl. No.: 413,314

[22] Filed: Mar. 30, 1995

Related U.S. Application Data

[63] Continuation of Ser. No. 159,646, Nov. 29, 1993, abandoned.

[51] Int. Cl.$^6$ ............................................. C04B 38/06
[52] U.S. Cl. ........................... 501/81; 501/83; 501/95; 428/307.7; 428/312.6
[58] Field of Search ........................ 501/80, 81, 83, 501/32, 95; 428/241, 307.7, 312.6, 376

[56] References Cited

U.S. PATENT DOCUMENTS

| | | | |
|---|---|---|---|
| 3,751,271 | 8/1973 | Kimura et al. | 106/40 R |
| 3,962,081 | 6/1976 | Yarwood et al. | 210/69 |
| 4,024,212 | 5/1977 | Dore et al. | 264/44 |
| 4,563,432 | 1/1986 | Ehlert et al. | 501/81 |
| 4,584,280 | 4/1986 | Nanao et al. | 501/80 |
| 4,654,314 | 3/1987 | Takagi et al. | 501/82 |
| 4,808,558 | 2/1989 | Park et al. | 501/80 |
| 4,828,774 | 5/1989 | Andersson et al. | 264/60 |
| 4,866,011 | 9/1989 | Hargus et al. | 501/82 |
| 4,871,693 | 10/1989 | Inoue et al. | 501/9 |
| 4,885,263 | 12/1989 | Brockmeyer et al. | 501/81 |
| 4,975,191 | 12/1990 | Brockmeyer et al. | 210/510.1 |
| 5,006,248 | 4/1991 | Anderson et al. | 210/500.25 |
| 5,045,511 | 9/1991 | Bosomworth et al. | 501/85 |
| 5,061,526 | 10/1991 | Robyn et al. | 427/422 |
| 5,077,241 | 12/1991 | Moh et al. | 501/84 |
| 5,079,082 | 1/1992 | Leiser et al. | 428/307.7 |
| 5,094,906 | 3/1992 | Witzke et al. | 428/220 |
| 5,096,745 | 3/1992 | Anderson et al. | 427/226 |
| 5,104,539 | 4/1992 | Anderson et al. | 210/500.25 |
| 5,190,897 | 3/1993 | Azumi | 501/81 |
| 5,232,525 | 10/1993 | Gonzales et al. | 501/124 |
| 5,279,993 | 1/1994 | Rothfuss et al. | 501/81 |

*Primary Examiner*—Karl Group
*Attorney, Agent, or Firm*—Quarles & Brady

[57] ABSTRACT

Methods have been developed to make porous ceramic membranes having macroscopic channels therethrough. The novel membranes are formed by temporarily supporting the sol-gel membrane precursor on an organic support which is ultimately removed from the interior of the membrane, preferably by pyrolysis or by chemical destruction. The organic support may also include an inorganic metal portion that remains on destruction of the organic portion, providing structural support and/or chemical reactivity to the membrane. The channels formed when the organic support is destroyed provide the ability to withdraw small catalytic products or size-separated molecules from the metal oxide membrane. In addition, the channel-containing membranes retain all of the advantages of existing porous ceramic membranes.

5 Claims, 1 Drawing Sheet

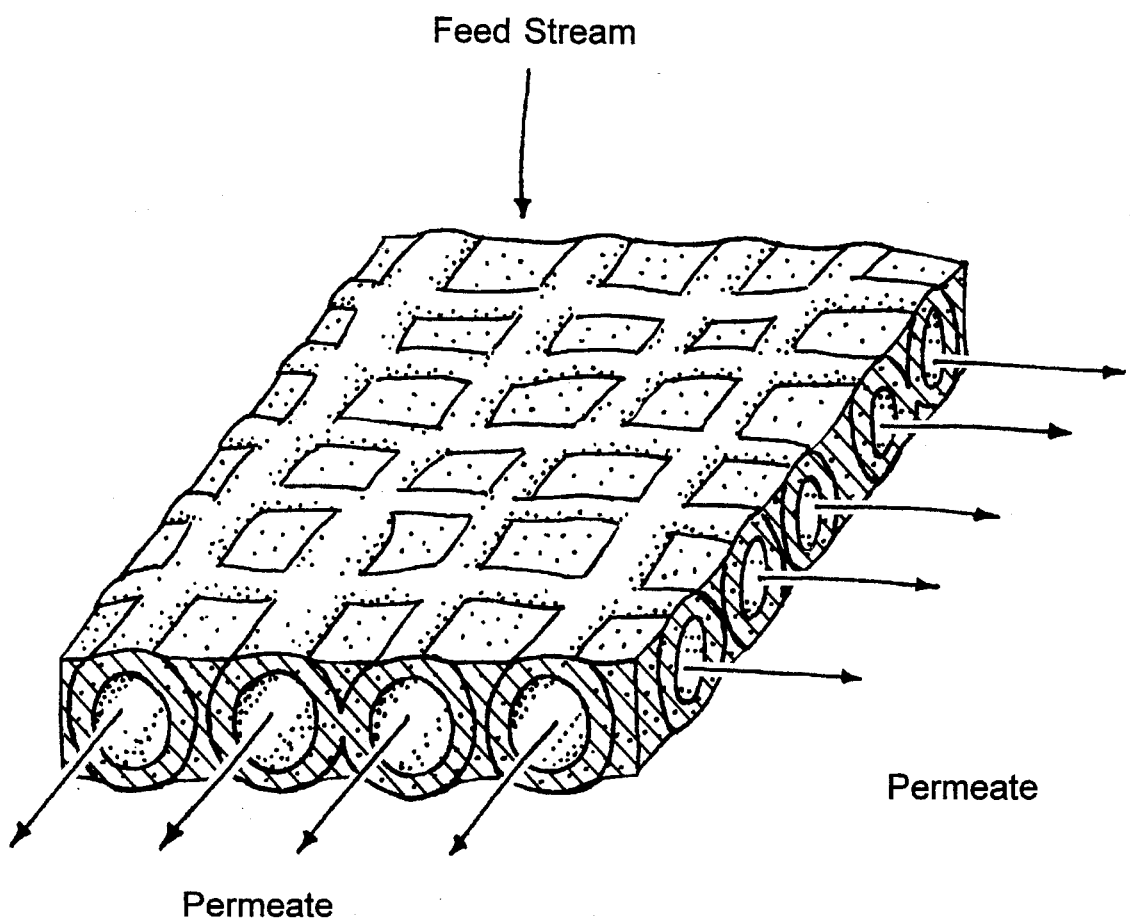

CERAMIC MEMBRANES HAVING MACROSCOPIC CHANNELS

STATEMENT REGARDING FEDERALLY SPONSORED RESEARCH

This invention was made with United States Government support awarded by the Department of Energy (DOE), Grant Nos. DE-FG07-86ID12626 and DE-FG07-91ID13062. The United Government has certain rights in this invention.

This is a continuation of application Ser. No. 08/159,646 filed Nov. 29, 1993 now abandoned.

FIELD OF THE INVENTION

The present invention relates to the field of ceramic membranes in general and relates in particular, to the field of porous ceramic membranes having macroscopic channels therethrough.

BACKGROUND OF THE INVENTION

Ceramic membranes are most commonly used to separate mixtures of liquids and gases, and to catalyze chemical reactions. The membranes are advantageous because both membrane composition and pore size may be adjusted to produce membranes having the properties desired for the particular separation or catalysis. Much effort has, therefore, been directed to improving the catalytic efficiency and throughput of ceramic membranes, particularly in membranes used both for catalytic dehydrogenation and for separating the dehydrogenation products.

Membranes having smaller pores are more useful for separations on the basis of size exclusion. Methods exist for synthesizing membranes having a desired porosity by varying the size of particles in the colloidal sol from which the membrane is formed, as detailed below.

Anderson, et al., *J. Memb. Sci* 39: 243–258 (1988), describes various methods of making particulate sols and membranes from transition metal oxides. Particulate ceramic membranes are typically formed through a process beginning with metal-organic compounds. The compounds are hydrolyzed to form small metal oxide clusters, which in turn aggregate to form metal oxide particles. The particles are then fused into a unitary ceramic material. The gaps between the fused particles form a series of pores in the membrane.

Metal oxide ceramic membranes are generally created using a sol-gel procedure. Usually, a metal oxide is initiated into the process as a metal alkoxide solution. The metal alkoxide is hydrolyzed to form metal hydroxide monomers, clusters or particles, depending on the quantity of solvent used. The insoluble metal oxide particles are then peptized by the addition of an acid which increases the tendency of the metal oxide particles to remain in suspension, presumably due to charges acquired by the particles during the peptizing process.

Such a sol can be evaporated to form a semi-solid gel. Further evaporation, and then sintering, of the gel results in a durable rigid material formed either as an unsupported membrane or as a supported membrane or thin film coated onto a substrate. The substrate can be either porous or non-porous, and either metallic or non-metallic, depending on the particular application.

With regard to the composition of the membranes, ceramic membranes have been created using many materials. For example, Leenaars et al., *Jour. of Membrane Science*, 24: 261–270 (1985), report the use of the sol-gel procedure to prepare supported and unsupported alumina membranes. In addition, Yoldas conducted significant research on the fabrication of gamma-alumina membranes made by a sol-gel process. Yoldas was able to achieve a relatively small particle size in the sols and was able to achieve porous membranes. Yoldas, *Jour. Mat. Sci.*, 12:6, pp. 1203–1208 (1977). Yoldas also investigated the manufacture, through sol-gel processes, of mixed alumina and silica materials. One class of materials which Yoldas prepared were alumina-siloxane derivatives which formed polymeric cross-linkages making polymeric, rather than particulate, ceramic materials. Yoldas was also able to make several large monolithic glass samples of varying compositions of silica and alumina that did retain some porosity and high surface area, as described in the article in *Jour. Mat. Sci.*, supra. Ceramic membranes composed of titania, zirconium and other metal oxides have also been reported.

The mechanism of operation and types of separations which can be achieved by ceramic membranes are discussed in general by Asaeda et al., *Jour. of Chem. Enq. of Japan*, 19[1]: 72–77 (1986). At least one line of ceramic filters is currently marketed under the trade name "Ceraflo" by Millipore Corporation of Worcester, Mass.

Ceramic membranes offer several advantages over organic membranes, which are also used for separation and catalysis. Ceramic membranes are more resistant than organic membranes to organic solvents, chlorine, and extremes of pH. Ceramic membranes are also inherently more stable than organic membranes at high temperatures, thus allowing more efficient sterilization of process equipment. Ceramic membranes are also generally quite resistant to microbial or biological degradation, which can occasionally be a problem with organic membranes. Ceramic membranes are also more mechanically stable under high pressures.

Although the pore size and composition requirements of ceramic membranes have been extensively researched, the art is not similarly developed with respect to macroscopic membrane attributes that may be optimized to further enhance the utility of ceramic membranes for separation and catalysis.

SUMMARY OF THE INVENTION

The present invention is summarized in that a network of macroscopic channels in a porous ceramic membrane useful for catalysis and separation increases membrane efficiency by providing, within the membrane, an exit path through which small catalytic dehydrogenation or separation products may leave the membrane. Only small molecules may exit through the macroscopic channels; larger products are prevented, by the porous structure of the membrane, from reaching the channels. By removing small catalytic dehydrogenation products from a catalytic membrane, catalysis is made more efficient in two ways. First, removal of a dehydrogenation product drives the reaction equilibrium strongly in favor of continued catalysis. Second, removal of a dehydrogenation product prevents the formation of by-products, reducing or eliminating the re-formation of substrate molecules and thereby increasing the effective reaction rate.

The invention is further summarized in that a method for forming porous ceramic membranes having a network of continuous macroscopic channels involves forming the porous membrane around a removable organic or organometallic support and then destroying the organic support, leaving behind channels of approximately the same size and shape as the support. Because the membranes of the present invention are inherently fragile, methods are also disclosed for providing the membranes of the present invention with an integral ceramic reinforcing phase.

It is an object of the present invention to provide porous ceramic membranes having small pore sizes and having continuous macroscopic channels that may be used for separation and catalytic processes.

It is another object of the present invention to provide a method for producing porous ceramic membranes having small pore sizes and having continuous macroscopic channels.

Other objects, advantages and features of the present invention will become apparent from the following specification.

BRIEF DESCRIPTION OF THE DRAWING

The drawing shows an embodiment of a porous ceramic membrane of the present invention.

DETAILED DESCRIPTION OF THE INVENTION

The present invention is directed to providing porous ceramic membranes and porous ceramic materials in other forms for separation and/or catalysis having a network of continuous macroscopic channels therethrough. A schematic depiction of such a porous ceramic material is shown in the drawing. The term "membrane" as used herein, is also intended to encompass a broad range of porous ceramic materials in other forms, such as pellets, wherein the ceramic materials have continuous macroscopic channels therethrough. "Macroscopic" channels are not necessarily visible to the naked eye. The term "macroscopic" describes a channel that would be apparent within a membrane to one observing the membrane at magnifications typically used to evaluate membranes. The membranes are formed from metal sols deposited upon a removable organic support matrix. The organic support matrix attracts the sol, which ultimately dries and is sintered to form a membrane. When formed, the membrane adopts the shape of the organic support. For instance, when the organic support is a woven matrix, the membrane itself assumes the form of a woven matrix, even after the organic support has been removed.

An organic support appropriate for use in forming the membranes of the present invention has an affinity for a metal sol, is formed of continuous fibers, and is easily removed after the solid membrane forms. In the preferred embodiment, the organic support was 100% cotton cheesecloth with 40–50 threads per inch. Alternatively, the support may be an organic material such as thread or string and may be spooled. Preferably, though not essentially, the organic support is washed thoroughly before use to remove impurities that might otherwise remain within the membrane after the support is removed.

The support can include an organic portion and a metal portion. Such a combined support would be partially removable by burning or other treatment and would advantageously leave behind the metal portion in the membrane to provide a desired chemical activity or to increase structural integrity. One type of combined support is a metallic cheesecloth in which a certain percentage of the support fibers are metal fibers. To produce a membrane having a network of channels therethrough, a metal sol is applied to the support matrix until the sol just saturates the support. The organic support is pre-cut to a desired size and is placed on a horizontal surface, such as a polystyrene weighing boat before the sol is applied. The metal sol may be formed of any transition metal or metal oxide or combination of transition metals or metal oxides. To prepare metal sols, alkoxides of one or more transition metals in solution are hydrolyzed under conditions that favor the formation of metal oxide particles in the resulting colloidal suspension, or sol. As noted, the catalytic and separation qualities of the membrane are determined by the nature of the sol particles, which are in turn determined by the sol formation conditions. For example, the pH of the alkoxide solution must be carefully controlled, to suspend the resulting particles in the solution so that a stable sol can result.

The sol that coats the organic support is dried until it becomes a semi-solid xerogel, which can be further dried to form a gel. The gel and the immobilized support are then heated at a temperature that is sufficiently high to sinter the gel, thereby forming a ceramic membrane having a matrix of small pores formed during sintering. References in this patent application to "ceramic" membranes are intended to encompass all porous metal membranes formed by sintering, firing, or heating a gel.

Typically, the heat of sintering the gel to form the membrane is sufficiently high to pyrolyze the organic support. However, depending upon the support matrix and sintering temperature chosen, it may be necessary to take further steps, such as an acid, basic, or organic degradation, to remove the support embedded in the membrane. After the support is removed, continuous channels remain throughout the membrane interior. As noted above, the porous ceramic membrane assumes the shape of the organic support and, therefore, void spaces form between the fibers of the support matrix.

The membrane thus formed is quite fragile after the support is removed, and it may be desirable to apply a second coating of sol onto the membrane to prevent the membrane from breaking. The second coat is preferably applied on a Teflon® surface, such as a weighing boat. The second coat of sol may be applied with a pipet, taking care to avoid the channels at the membrane sides. Even if some colloidal sol does enter the channels, it is unlikely that the channels would become blocked, insofar as a large quantity of sol would be required to fill the macroscopic channels. The excess sol may be poured from the Teflon® surface and the sol-coated membrane dried lying on the Teflon® surface.

Because the channel-containing porous ceramic membrane of the present invention is fragile, it is also desirable that the mechanical strength of the membrane be increased by filling the void spaces of the membrane with a less fragile ceramic support, such as a sintered ceramic powder suspension of a silica-based material, such as clay or glass. The ceramic support can be inorganic or organic. The suspension may be applied to the membrane in liquid form using a pipet, and then dried to form a green body. The suspension is preferably dried slowly overnight in ambient conditions to prevent cracking of the unfired green body and disruption of the membranous fabric network. After drying, the ceramic powder green body may be fired at a temperature that sinters the powder and permits the membrane fibers to bind to the mechanical support. This temperature will vary depending upon the ceramic powder material used, but is preferably in the range of 500° C.–700° C. The sintered ceramic reinforcing phase should be porous and should not restrict access of liquid or gas to the membrane. Instead, the composition and pore size of the membrane, not the reinforcing phase, should dictate the catalytic or separative process that occurs.

A most preferred method for depositing and reinforcing a sol onto a support involves dipping the support two or more times into the sol then dipping the coated support into a ceramic powder suspension such as powdered glass or alumina whiskers one or more times prior to drying and firing. To obtain a thicker membrane, the two dipping steps may be sequentially repeated before drying and firing.

In the preferred embodiment, an alumina-silica sol was used to form the membrane, although any metal or metal oxide sol that can form a porous ceramic membrane, using a sol-gel process known to one skilled in the art, is intended to be within the scope of the present invention. In an alumina-silica sol, molecular or atomic scale mixing of alumina and silica can occur to give a single-phase solid. To prepare a membrane using this procedure, a silicon alkoxide, such as tetramethyl orthosilicate (TMOS) dissolved in butanol, and Aluminum Tri-Sec-Butoxide (ATSB), also dissolved in butanol, are mixed in the desired aluminum to silicon ratio and allowed to react for a suitable time period, such as an hour. An equal quantity of butanol, containing a small amount of water and concentrated nitric acid, is dropped into the mixed alkoxide system slowly at room temperature. The final resulting sol, which preferably contains about one mole of water and 0.07 moles of the concentrated nitric acid per mole of total alkoxide (TMOS and ATSB), is then heated to the boiling point for approximately two hours. The resulting cloudy solution is centrifuged to obtain a transparent sol.

In the aluminosilicate system, the particles of the membrane are atomic-level combinations of aluminum and silicon oxides. This, and other methods, such as mixing of separate alumina and silica sols, will produce membranes of mixed alumina and silica materials. Using the second procedure, separate particles of alumina and silica oxides are fused in a common particulate membrane creating a continuous fused ceramic material of mixed alumina and silica particles.

The sol thus created, and applied to the organic support as described above, may then be dried slowly at room temperature to form a xerogel. Such xerogels, once finally dried, may subsequently be fired at temperatures up to 1000° C. to produce aluminosilicate or mixed alumina-silica microporous ceramic membranes. At higher temperatures, the porous structure of the membrane would be lost and a unitary solid formed instead. A preferred temperature for sintering aluminosilicate membranes is about 500° C. Sintering temperatures as low as 200° C. have been shown to be sufficient to sinter some porous metal oxide membranes.

Porous ceramic materials such as those described above have porosities that may be varied for use in catalytic or separation processes. The pore sizes of the materials are determined by the size of the sol particles which are fused together to form the membranes. In essence, if the particles are joined in a close-packing model, the pores of the material are simply determined by the spaces between the spherical particles. Thus, the smaller the particle, the smaller the pores. By tightly controlling the sol processing, the particles can be created in a relatively uniform size distribution, resulting in a membrane which has a relatively tight range of mean pore sizes. Such materials are particularly useful for separation processes including ultrafiltration, reverse osmosis, and gas separation. Pore sizes in the membrane of less than 100 Angstroms, which can readily be achieved, permits effective use in ultrafiltration. Materials with pore sizes less than 20 Angstroms, which have also been made, offer utility particularly for gas separation and molecular sieving.

It is noted, however, that while membranes having micropores are described herein, the mean diameter of the pores in a porous ceramic membrane produced according to the method is not intended to limit the scope of the invention. Membranes having a mean pore diameter other than those described are prepared by adjusting the size of the particles in the precursor sols from which the membranes are formed. The art is cognizant of the relationship between the size of particles in a precursor sol and the diameter of the pores in membranes formed from the sol. Therefore, one of ordinary skill would be able to select an appropriate sol having particles of any desired size for use in the method of the present invention to achieve a microporous or macroporous membrane having a network of macroscopic channels wherein the mean pore diameter of the pores were desired for a particular application.

Moreover, for purposes of the present invention, the above described membranes are particularly useful in that the channels formed by the removable organic or metal-organic support provide a network within the membrane through which small molecules may be eliminated after the molecules pass through the membrane pores and into the macroscopic channels.

The invention may be better understood by consideration of the following examples which are intended to be exemplary rather than limiting:

Formation of Aluminosilicate Sol

To prepare an aluminosilicate sol, quantities of tetramethyl orthosilicate (TMOS) and Aluminum Tri-Sec-Butoxide (ATSB) were mixed in butanol. The relative proportions between the TMOS and the ATSB were adjusted to produce a 15% alumina:85% silica sol. Each of the alkoxides was separately dissolved in butanol, and then the two butanol solutions were themselves mixed. The mixture was then allowed to react for approximately one hour. Separately, an equal quantity of butanol was prepared containing a small amount of ultrapure water and concentrated nitric acid. The amount of water and nitric acid was calculated so that the final solution contained one mole of water and 0.07 moles of concentrated nitric acid per mole of total alkoxide. The aliquot of butanol containing the water and nitric acid was then dripped into the combined alkoxide solution slowly at room temperature. The final solution was then aged by stirring at the boiling point for approximately two hours. The resulting cloudy solution was then centrifuged to obtain a transparent sol.

Production of a porous aluminosilicate membrane having macroscopic channels

A piece of 100% cotton cheesecloth with 40–50 threads per inch was washed thoroughly in hot water with detergent, rinsed very thoroughly in deionized water, and dried at room temperature. The prepared cheesecloth was cut into roughly circular sheets of approximately 4" diameter. The cheesecloth, placed in a polystyrene weighing boat, was then barely saturated with the alumino-silicate sol, which had been prepared as described in the preceding example. Approximately 5 ml of sol was drizzled from a pipet over each 4" piece of cheesecloth. The saturation step was performed in a fume hood.

The sol-saturated cheesecloth was lifted from the weighing boat with a pair of tweezers to allow excess sol to drip off. To initiate the gelling step, the saturated cheesecloth was then hung from Parafilm-lined bulldog clips in a closed box for several hours. After several hours, the box was opened and the sol was allowed to dry further for one day. The gelling step was also performed in a fume hood.

The dried, coated cheesecloth was sandwiched between two flat, clean ceramic discs in preparation for firing. The plates minimized uneven shrinkage during subsequent firing steps. Also, evenly distributing weight on the cheesecloth during firing results in a more uniform membrane.

The gel-coated cheesecloth was fired under the following firing profile: the furnace temperature was increased from room temperature to 1000° C. at a rate of 2° C. per minute. The 1000° C. temperature was maintained for 2 hours, at which time the furnace was turned off and the temperature was allowed to ramp down to room temperature. When cool, the plates were carefully removed from the furnace, examined and tested. In this firing protocol, the cheesecloth organic support was completely pyrolyzed and the resulting membrane assumed the matrix shape of the cheese cloth support, in that the membrane surrounded the support, but gaps existed between the strands of the matrix. Henceforth, the membrane formed around a cheesecloth support in the preferred embodiment is termed a "ceramic fabric."

Stabilizing the membrane with a powdered ceramic suspension

The ceramic fabric of the previous example was stabilized by filling in the void spaces between strands of the ceramic fabric with a powdered ceramic suspension. To form the powdered ceramic suspension, high-temperature resistant glass (e.g., Pyrex®) beakers or plate glass sheets were crushed to a powder which was suspended in water. Alternatively, alumina whiskers (ceramic fibers), or mixtures of powdered Pyrex® glass with alumina whiskers, were resuspended in water. The suspension was carefully applied, using a pipet, to the void spaces. Care was taken to avoid the channel exit holes at the sides of the ceramic fabric. The ceramic powder suspension was air dried slowly at ambient temperature for one day and was then sintered at 500° C.–750° C.

The results indicate that porous ceramic membranes may be produced by forming the membrane around removable organic supports. These porous membranes are useful for catalytic or separation processes like existing porous metal oxide membranes. However, the novel addition of macroscopic channels into the membranes expands their utility for both catalytic and separation processes. It is believed that the advantageous utility of these membranes arises from their increased surface area to volume ratio. As a further result of that feature, these membranes are less expensive to manufacture than existing membranes with lower surface area to volume ratios.

Because of the combination of the acidic alumina molecules and the basic silica molecules within the same membrane, these materials exhibit catalytic properties. In addition, the materials have higher temperature stabilities than other comparable membranes made with transition metals. The materials thus combine high temperature stability, very small pore size, and a pH stability greater than that achieved with either silica or alumina membrane materials by themselves. Thus the materials seem aptly configured for applications in separation and catalysis.

We claim:

1. A porous ceramic membrane, comprising:

a matrix of porous ceramic tubes in the shape of a woven fabric having a top face, a bottom face and at least one side face, the tubes comprising a first group and a second group, each tube in each group being parallel to and spaced apart from every other tube in that group, the tubes of the first group being perpendicular to the tubes of the second group, the matrix having voids between the tubes, each tube having a plurality of randomly distributed micropores having a mean pore diameter of less than 100 Å and having within each microporous tube a channel having a mean internal diameter greater than the mean pore diameter of the micropores, each tube having an external diameter, the matrix having a total thickness of no greater than two external tube diameters, each channel having a terminus on the at least one side face of the matrix, the channels being positioned relative to the micropores such that when a feed stream enters the micropores through the top or bottom face of the matrix, a permeate passes from the micropores through the channels to the channel termini at the sides of the matrix; and a porous ceramic reinforcing phase in the voids between the tubes of the matrix.

2. A porous ceramic membrane as claimed in claim 1 wherein the ceramic reinforcing phase comprises alumina whiskers.

3. A porous ceramic membrane as claimed in claim 1 wherein the ceramic reinforcing phase comprises sintered ground glass.

4. A porous ceramic membrane as claimed in claim 3 wherein the sintered ground glass is sintered ground plate glass.

5. A porous ceramic membrane as claimed in claim 3 wherein the sintered ground glass is glass that remains porous and does not restrict access of liquid or gas to the matrix after heating to a temperature as high as 700° C.

* * * * *